(12) United States Patent
Chen et al.

(10) Patent No.: US 8,388,260 B2
(45) Date of Patent: Mar. 5, 2013

(54) WATER-PERMEABLE AND WATER-ABSORBABLE ECOLOGICAL PAVING

(76) Inventors: Jui-Wen Chen, New Taipei (TW); Ting-Hao Chen, New Taipei (TW)

( * ) Notice: Subject to any disclaimer, the term of this patent is extended or adjusted under 35 U.S.C. 154(b) by 0 days.

(21) Appl. No.: 13/284,983

(22) Filed: Oct. 31, 2011

(65) Prior Publication Data

US 2012/0045279 A1    Feb. 23, 2012

(30) Foreign Application Priority Data

Apr. 14, 2011 (CN) .......................... 2011 1 0093317

(51) Int. Cl.
*E01C 11/00* (2006.01)
*E01C 7/14* (2006.01)

(52) U.S. Cl. ................ 404/17; 404/27; 404/30; 404/31; 405/50

(58) Field of Classification Search ............ 404/17, 404/27, 30–32; 405/50
See application file for complete search history.

(56) References Cited

U.S. PATENT DOCUMENTS

| | | | | |
|---|---|---|---|---|
| 2,746,365 A * | 5/1956 | Darneille | ........................... | 404/2 |
| 3,685,298 A * | 8/1972 | Takanashi | ....................... | 405/36 |
| 4,411,555 A * | 10/1983 | Minvielle et al. | ............... | 405/50 |
| 4,797,026 A * | 1/1989 | Webster | .......................... | 404/28 |
| 5,788,407 A * | 8/1998 | Hwang | ........................... | 404/81 |
| 6,095,718 A * | 8/2000 | Bohnhoff | ....................... | 405/52 |
| 6,585,449 B2 * | 7/2003 | Chen | ............................... | 404/2 |
| 7,351,004 B2 * | 4/2008 | Shaw et al. | ..................... | 404/17 |
| 8,142,101 B2 * | 3/2012 | Kaul | ............................... | 404/31 |

* cited by examiner

*Primary Examiner* — Raymond W Addie
(74) *Attorney, Agent, or Firm* — Leong C. Lei

(57) ABSTRACT

A water-permeable and water-absorbable ecological paving is formed of a water-permeable material that is commonly used in pavement construction and is mixed with unique hollow bodies, whereby all constituent components of the engineering material are uniformly mixed and laid to form an ecological paving layer. In addition to the water permeability of the base material, the paving layer also provide the functions of absorbing water, storing water, and retaining water, so as to reduce the likelihood of occurrence of water accumulation on the surface flooding and also to allow water to be greatly retained in the interior of the paving layer, whereby water vapor can be released from the interior to alleviate heat island effect in case of high temperature of the atmosphere.

8 Claims, 6 Drawing Sheets

WATER-PERMEABLE AND WATER-ABSORBABLE ECOLOGICAL PAVING

TECHNICAL FIELD OF THE INVENTION

The present invention generally relates to a water-permeable and water-absorbable ecological paving, and more particularly to a paving that is set on roads, garden yards, vacant lands to form a water-permeable and water-absorbable ecological paving layer, so that rainwater falls down in a rainfall duration can be quickly drained into water-collection hollow bodies and can further be allowed to slowly penetrate downward into and store in a gradation layer formed under the paving layer for effective reduction of water accumulation on surface and also for regulation of surrounding temperature and humidity.

DESCRIPTION OF THE PRIOR ART

As the soil has the function of absorbing water, and can release humidity when contacting the atmosphere in a dry or hot environment to generate a heat exchange effect with the atmosphere, and may automatically regulate the humidity so as to avoid the occurrence of heat island effect.

However, due to high development of urban lands and construction of infrastructures, the soils are widely covered by artificial paving so that the natural ecological environment is losing balance. In order to restore the balance between the modern constructions and environmental conservation, the govern agencies and concerned people are giving a great impetus to ecological construction practice in order to conserve and retain the original natural features of the surroundings. However, the conventional water-permeable paving technique is effective to conduct rainwater downward through proper arrangement of capillaries and pores, yet the capillaries and pores may easily get stuck and clogged up due to dust powders and oxidation, leading to deteriorating performance of draining rainwater. Thus, in case of great precipitation, water accumulation may occur on the surface and may even lead to flood disaster.

In view of these problems, the present invention aims to provide water-permeable and water-absorbable ecological paving that has excellent performance of water permeability and air permeability and provides the function so water storage and water retention.

SUMMARY OF THE INVENTION

Thus, the primary objective of the present invention is to provide a water-permeable and water-absorbable ecological paving, which allows rainwater on surface to be quickly drained and stored and retained in a gradation layer and also helps regulating surface temperature to reduce heat island effect to thereby show an advantage of improving global warming of the Earth.

To achieve the above objective, the present invention provides a water-permeable and water-absorbable ecological paving, which is formed of a water-permeable material, serving as a base material, that is commonly used in pavement construction, comprising water-permeable asphalt, water-permeable concrete, or a mixture of water-permeable asphalt and water-permeable concrete, and is mixed with unique hollow bodies, whereby all constituent components are uniformly mixed and laid to form an ecological paving layer. In addition to the water permeability of the base material, the paving layer also uses the hollow bodies that provide hollow interior spaces to absorb water, store water, and retain water, so that during rainfall, the rainwater can be quickly conducted downward into the underground to reduce the potential risk of water accumulation on surface and thereby reducing the likelihood of surface flooding. Further, the paving layer may greatly retain water in the interior thereof so that when the temperature of the atmosphere gets high, the paving layer allows the water vapor to release from the interior thereof to reduce the heat island effect.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
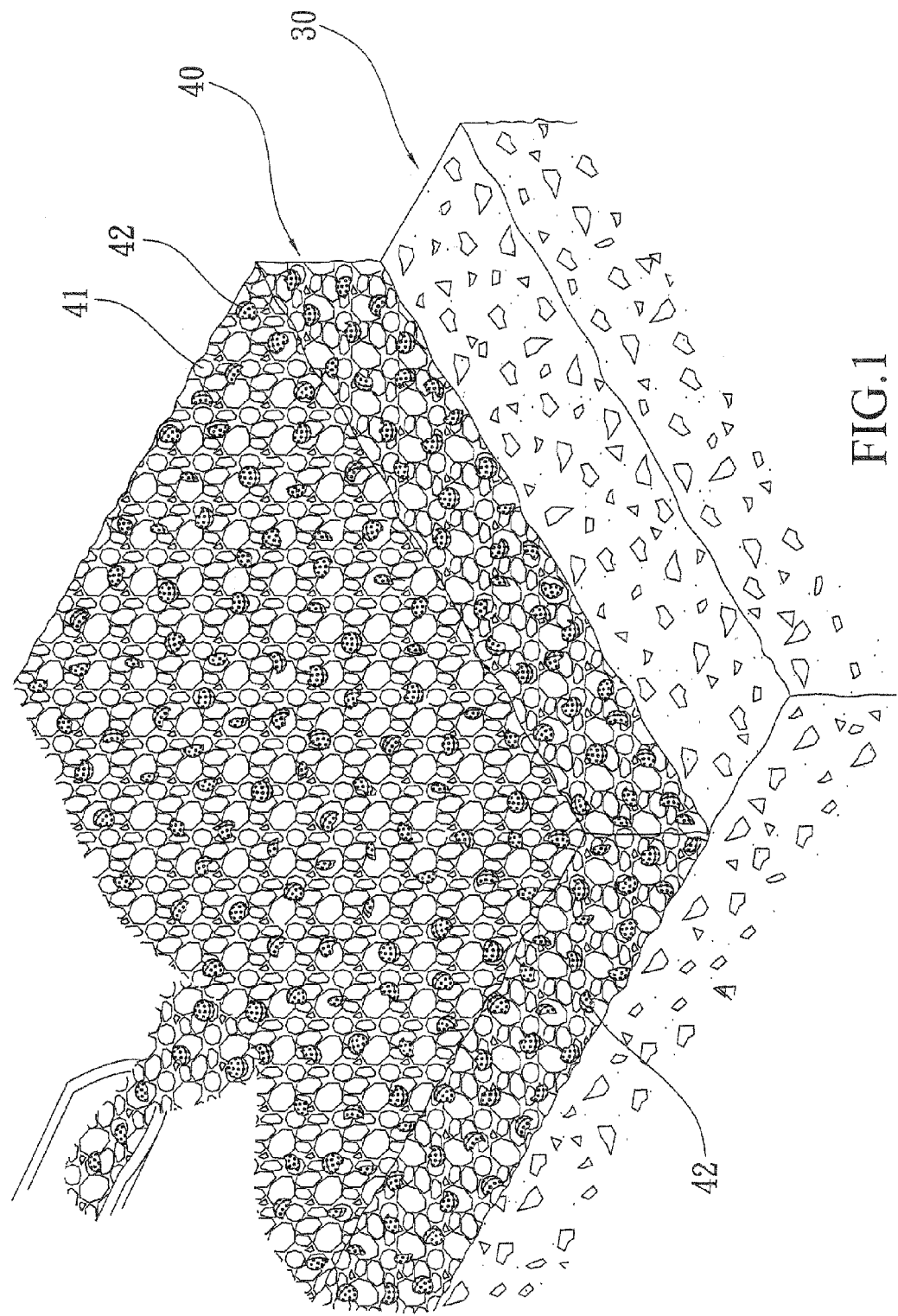
FIG. 1 is a schematic perspective view demonstrating construction of a paving layer according the present invention.
Figure 2:
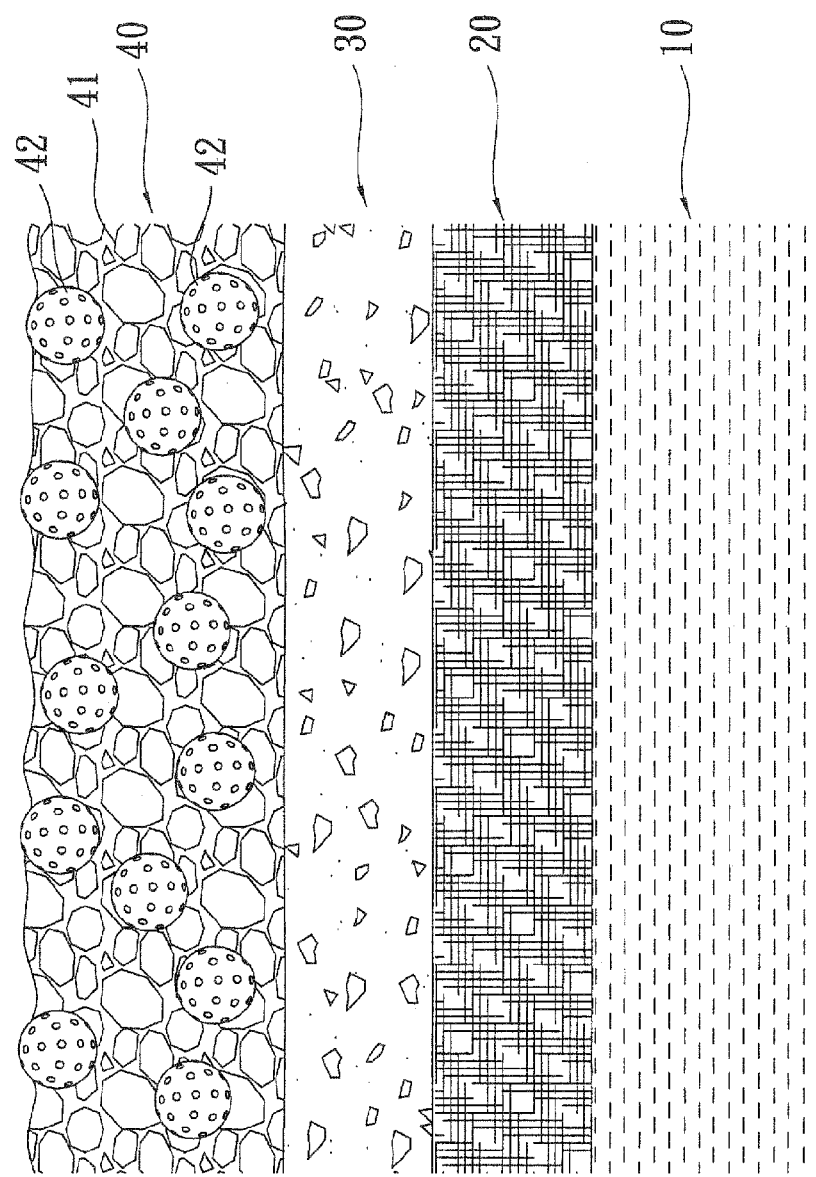
FIG. 2 is a schematic cross-sectional view showing the paving layer according to the present invention.

Referring to FIGS. 1 and 2, the present invention provides a water-permeable and water-absorbable ecological paving, of which a basic structure is formed through a construction method that provides advantages in respect of ecology and environmental conversation. As shown in FIG. 2, the geological structure to which the construction method is applicable comprises an underground water stratum 10 under an underground soil stratum 20. A gradation layer 30 is laid on the soil stratum 20. The gradation layer 30 may be on-site earth, or gradation material commonly used for road construction, including aggregates, soils, gravels, a mixture of water-permeable concrete, and additionally and selectively comprising other gradation materials that are of no harm to the environment and that are used as paving materials and is subjected to pressurization for ramming. Afterwards, an ecologic paving layer 40 according to the present invention is then set atop the gradation layer 30. Of course, unless the paving layer is constructed for supporting heavy vehicles, the paving layer can be directly employed on regular soil layer or stratum.

Referring to FIGS. 1-4, the material used in the above mentioned ecological paving layer 40 is formed by adding unique hollow bodies 42 in a water-permeable material that is commonly used for paving construction of which an example used in the instant embodiment is water-permeable asphalt. The hollow body 42 has a shell that is of a structure of great thickness and forms a plurality of through apertures 43. All the constituent materials are uniformly mixed and then laid. The hollow bodies 42 are preferably in the form of sphere, for a sphere is more resistant to compression stress from any direction and provide the greatest voids within the gradation layer 40. Preferably, the hollow body 42 is composed of two halves that are adhesively bonded to each other or are bonded to each other through mated steps formed at jointing edges, or are bonded to each other through coupling structures, or alternatively an integrally formed unitary hollow body made with blow molding or perfusion molding. Preferably, the hollow bodies are made of plastics, but they can be made of other acceptable traditionally used materials or recycled and regenerated materials.

Figure 3:
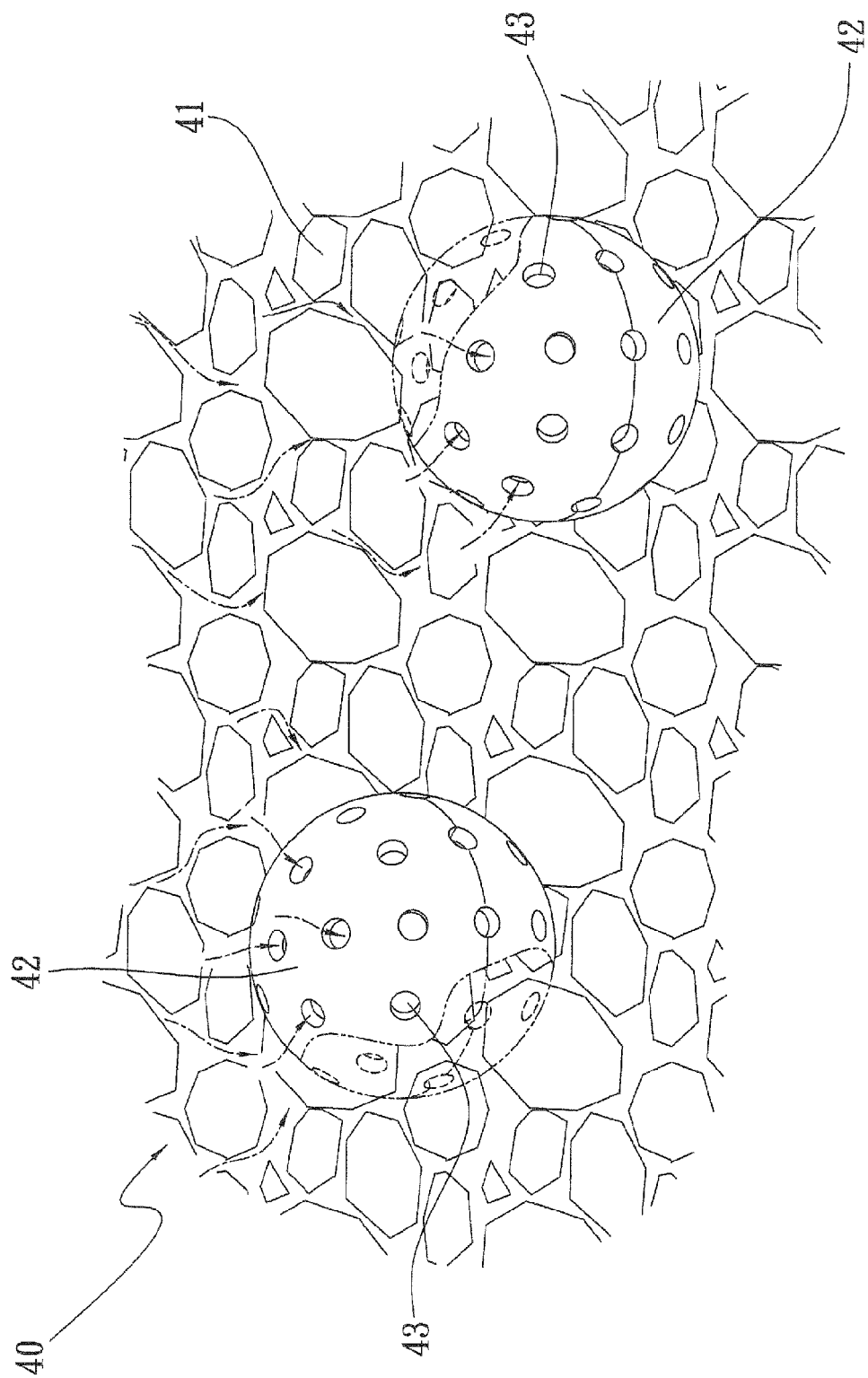
FIG. 3 is a schematic view showing hollow bodies mixed in the paving layer according to the present invention.
Figure 4:
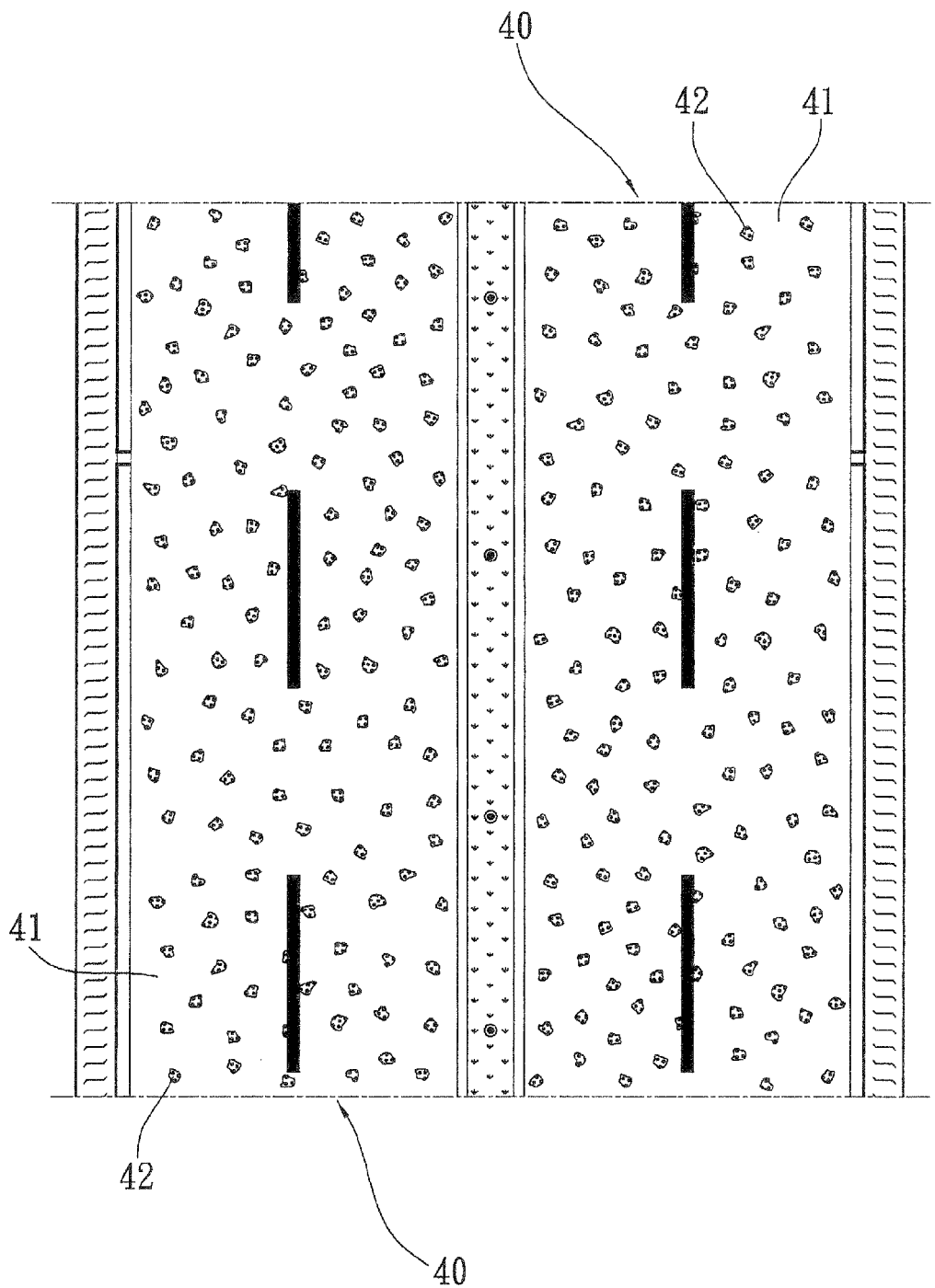
FIG. 4 is a schematic view illustrating an application of the present invention to road paving.

When the present invention is applied to paving of road, the hollow bodies 42 are paved in combination with the water-permeable asphalt 41 with a portion of the hollow bodies 42 located at paving surface and partially exposed (as shown in FIGS. 2 and 4), so that when a great rainfall occurs on the surface, the through apertures 43 formed in the shell of the hollow bodies can quickly conduct the rainwater into the interior space of the hollow bodies 42 to allow high degree saturation of water content (as illustrated in FIG. 3) so as to effectively reduce water accumulation on the surface. The present invention may is also helpful in reducing the likelihood of occurrence of local flood disaster in a short period. Once no rainwater further penetrates downward from the surface, the water stored in the hollow bodies 42 will be released in a slow manner to slow penetrate downward into the underground soil stratum 20 and the underground water stratum 10. This allows surface water to be fast drained in a very short period and is also helpful in supplementing underground water.

The hollow bodies 42 are paved in combination with the water-permeable asphalt 41 to form road paving. In applications where the paving is made on roads that do not require high paving strength or walkways of gardens and yards, the water-permeable asphalt 41 may be replaced by water-permeable concrete.

Further, according to the present invention, the hollow bodies 42 may be filled, in the interior thereof, with water-absorbing substance(s), such as sponge or any substance that absorbs and contains water but is not easily decomposed by microorganisms. These water-absorbing substances may absorb and thus contain water when water flows therethrough, so that the water can be effectively retained and not get lost thereby providing the paving layer 40 of the present invention with high functionality of water retention. When the surface is at high temperature and scorching hot, the high content of water in the paving layer 40 allows the water to convert into vapor and releases the water vapor to the outside for heat exchange with the surroundings and thus avoiding occurrence of the heat island effect or at least alleviating the heat island effect.

Figure 5:
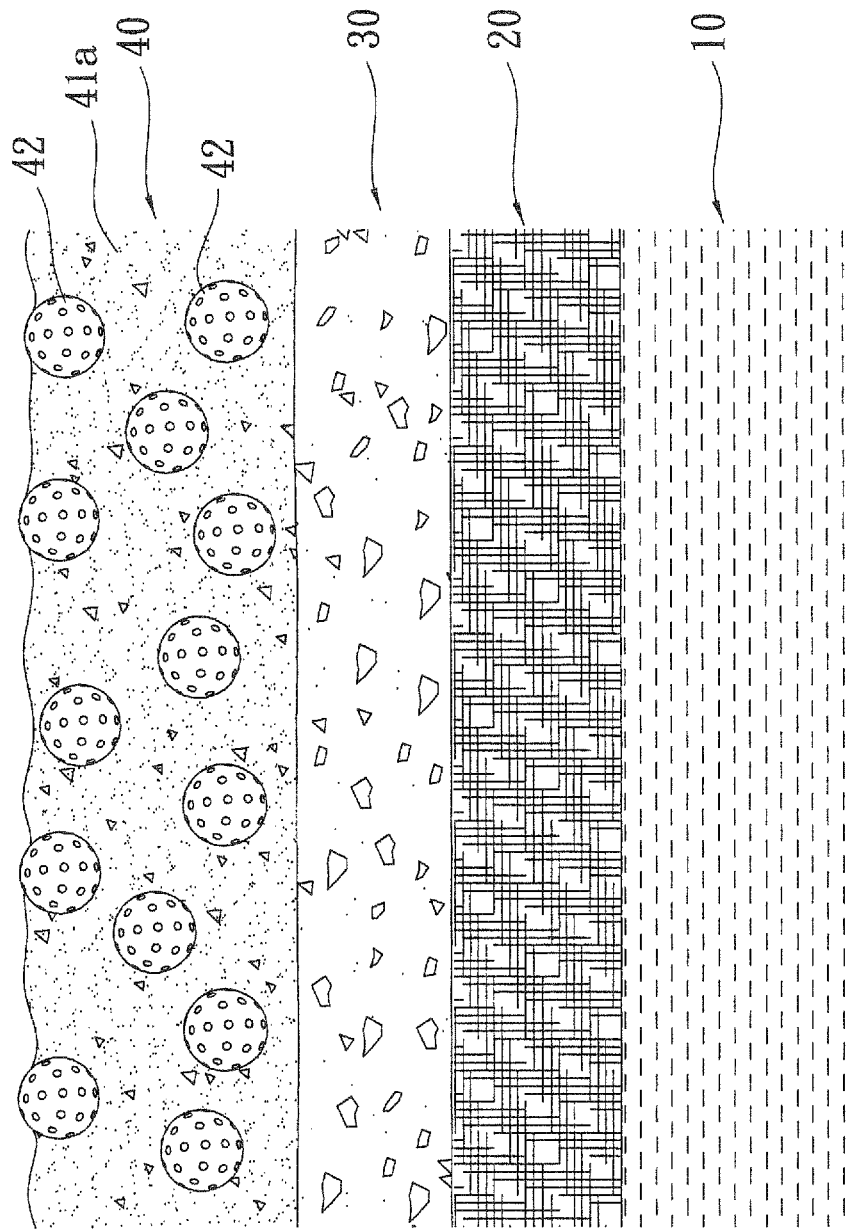
FIG. 5 is a schematic cross-sectional view illustrating a paving layer according to another embodiment of the present invention.
Figure 6:
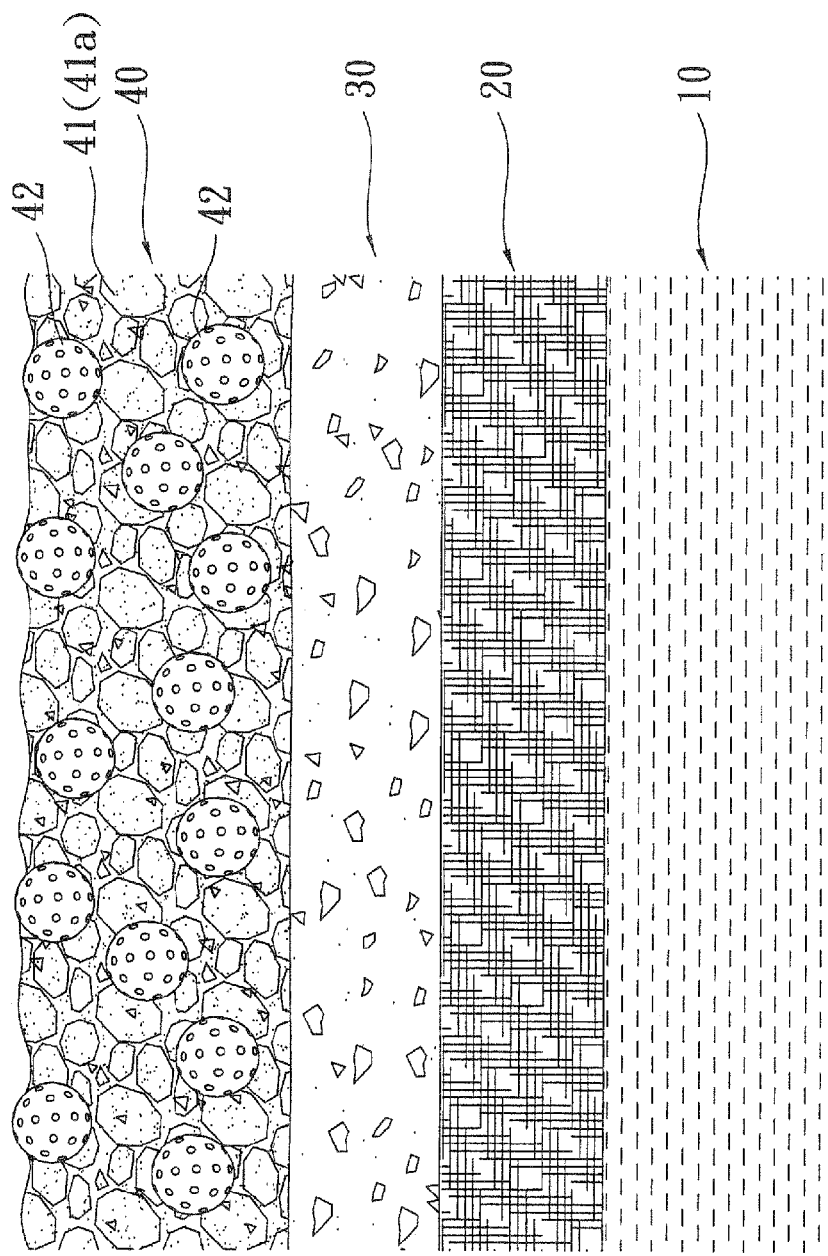
FIG. 6 is a schematic cross-sectional view illustrating a paving layer according to a further embodiment of the present invention.

Referring to FIGS. 5 and 6, the paving layer 40 according to the present invention comprises a water-permeable material, which can be varied according to the paving site and situation of application to for example mix hollow bodies 42 with water-permeable concrete 41 a for making paving (as shown in FIG. 5), or adding water-permeable concrete 41a at a predetermined ratio to water-permeable asphalt 41 and further mixing with hollow bodies 42 for subsequently making paving (as shown in FIG. 6). These also provide a way of constructing water-permeable and water-absorbable ecological paving according to the present invention with the same functionality as disclosed above.

In summary, the present invention provides ecological paving serving as an ecological paving construction practice that provides a high degree saturation of water content so as to allow rainwater that penetrates downward in rainfall to flow through the apertures of the hollow bodies and thus filling into and retained in the hollow bodies. This provides a measure of supplementing underground water and also allows release of water vapor in a hot weather to regulate the temperature of atmosphere to thereby make a contribution to environmental conservation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A water-permeable and water-absorbable paving, characterized in that:
   the paving is formed of a mixture of a water-permeable material and hollow bodies that are substantially uniformly mixed and distributed in the material, the hollow bodies being spaced from each other in the material and some being completely buried in the material, the hollow bodies forming uniformly distributed through apertures.

2. The water-permeable and water-absorbable paving according to claim 1, wherein the water-permeable material comprises water-permeable asphalt.

3. The water-permeable and water-absorbable paving according to claim 1, wherein the water-permeable material comprises water-permeable concrete.

4. The water-permeable and water-absorbable paving according to claim 1, wherein the water-permeable material comprises asphalt combined with water-permeable concrete.

5. The water-permeable and water-absorbable paving according to claim 1, wherein the hollow bodies are water-retention hollow bodies, the hollow bodies receiving a water-absorbing substance filled therein, the water-absorbing substance being sponge or a substance that absorbs and contains water and being not decomposable by microorganisms.

6. The water-permeable and water-absorbable paving according to claim 1, wherein the hollow body is formed by mating two halves of shell.

7. The water-permeable and water-absorbable paving according to claim 1, wherein the hollow body is integrally formed as a unitary body made with blow molding.

8. The water-permeable and water-absorbable paving according to claim 1, wherein the hollow body is integrally formed as a unitary body made with perfusion molding.

* * * * *